C. E. ERICKSON.
VARIABLE SPEED TRANSMISSION.
APPLICATION FILED DEC. 27, 1917.
1,318,199.
Patented Oct. 7, 1919.
2 SHEETS—SHEET 1.
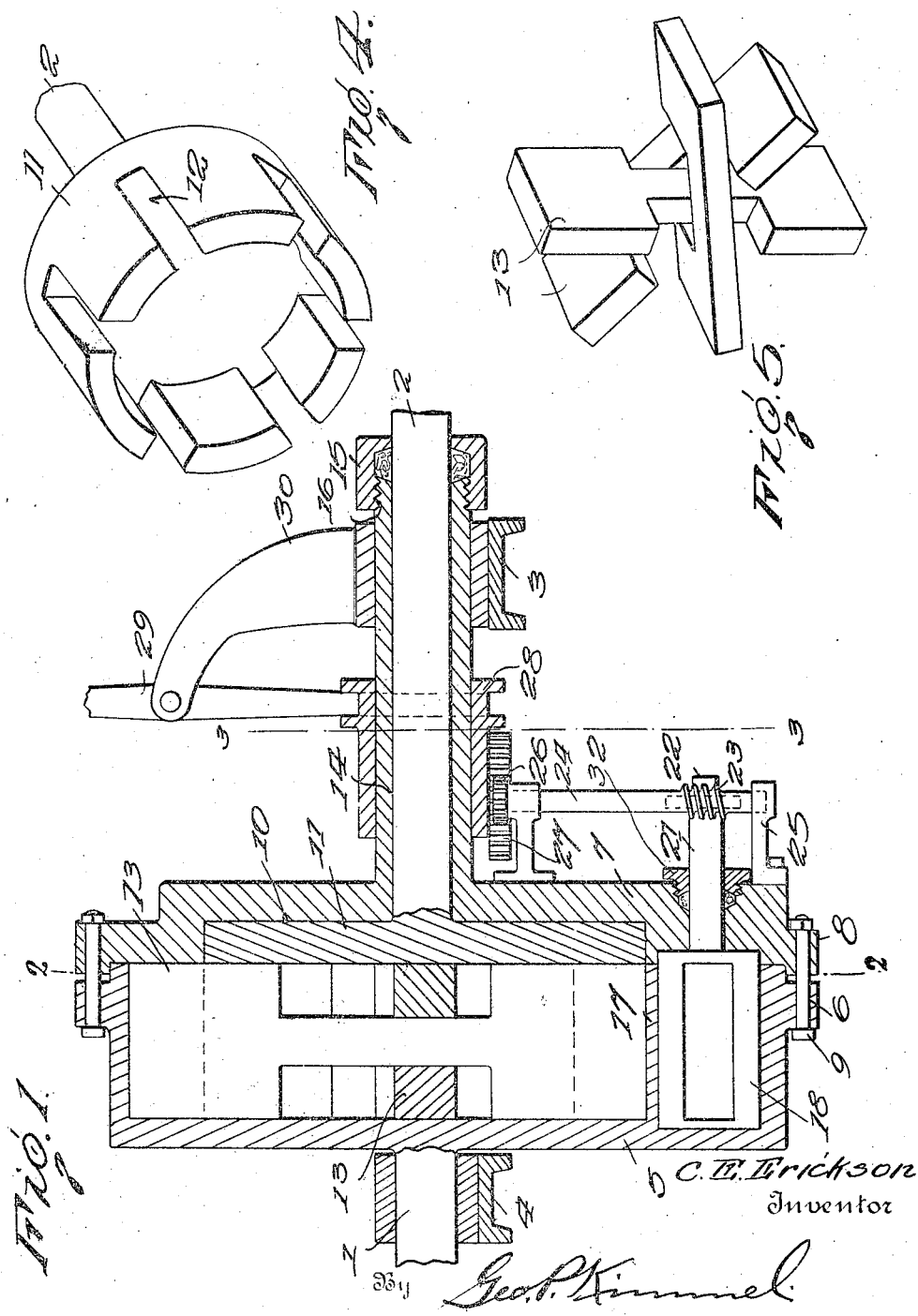
C. E. Erickson
Inventor
By Geo. P. Kimmel
Attorney

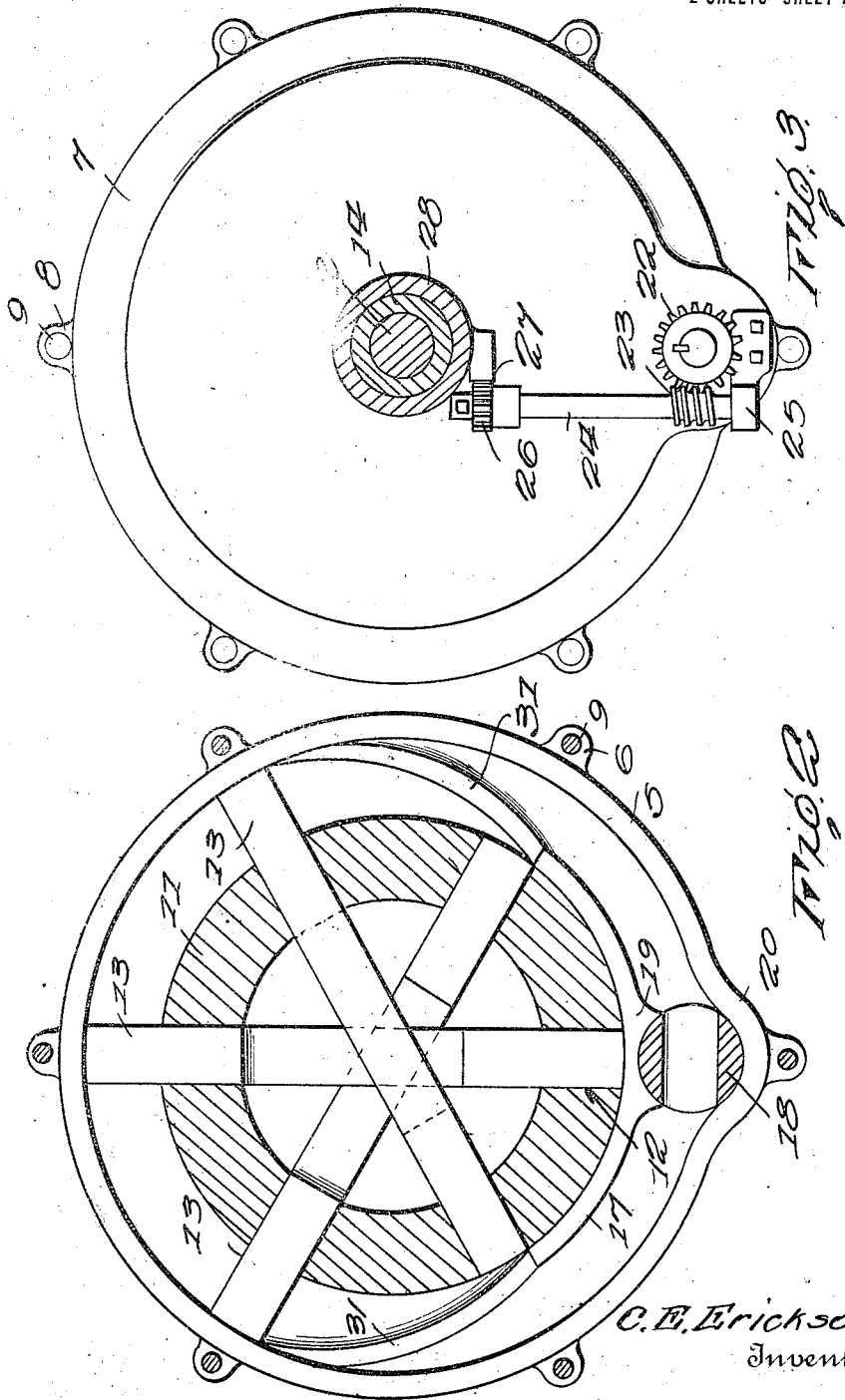

UNITED STATES PATENT OFFICE.

CARL E. ERICKSON, OF MENOMONIE, WISCONSIN.

VARIABLE-SPEED TRANSMISSION.

1,318,199.                    Specification of Letters Patent.    Patented Oct. 7, 1919.

Application filed December 27, 1917. Serial No. 209,077.

*To all whom it may concern:*

Be it known that I, CARL E. ERICKSON, a citizen of the United States, residing at Menomonie, in the county of Dunn and State of Wisconsin, have invented certain new and useful Improvements in Variable-Speed Transmissions, of which the following is a specification.

This invention relates to variable speed transmission mechanism and it is the principal object of the invention to provide an improved power transmitting means which will eliminate the use of sliding, planetary and other forms of gearing, and clutches whereby a plurality of different driving relations can be established between the driving and driven shafts of a motor driven vehicle or the like, thus permitting a number of different speed ratios to be obtained.

Another and equally important object of the invention is to provide a device of the character described which is exceedingly simple in construction and operation and which will eliminate the intricate gear shifting operations now necessary in connection with the usual transmissions, or the employing of magnetic or other forms of gear shifting means.

Other independent objects are to provide features of construction of portions of the device which tend toward the attainment of the above aims irrespective of the relation in which they are used.

Other objects will be in part obvious and in part pointed out hereinafter.

The invention consists, furthermore, in the novel arrangement and combination of the parts of the device, as well as in the details of the construction of the same, all of which will be more fully described in the following specification, and then finally embodied in the clauses of the claim which are appended to the specification and which form an essential part of the same.

The invention is clearly illustrated in the accompanying drawings, in which:—

Figure 1 is a vertical longitudinal section through the device,

Fig. 2 is a vertical transverse section therethrough in the plane of the section line 2—2 of Fig. 1, Fig. 3 is a vertical section taken on the line 3—3 of Fig. 1, Fig. 4 is a detail in perspective of the rotatable head, and, Fig. 5 is a detail in perspective showing the relative positioning of the piston elements.

Similar reference characters refer to similar parts throughout the several views of the drawings.

Having more particular reference to the drawings, 1 represents the driving shaft of the power transmission means and 2 the driven shaft thereof. As will be noted, the said shafts are supported in suitable bearings designated 3 and 4.

Engaged with the free end of the driving shaft 1 in a suitable manner, is a casing seat 5, the said casing being circular in shape and having a plurality of peripherally disposed apertured lugs 6 formed thereon, the purpose of which will be presently apparent. An annular closure plate 7 is provided and carries apertured lugs 8, similar to the lugs 6, whereby connecting bolts 9 may be passed through the same when properly alined. In this connection, it is to be noted that the closure plate 7 is provided with a circular seat 10 adapted to receive a correspondingly formed head 11 therein, which head is provided with a series of laterally projecting flange segments defining openings 12 through which blades or piston elements 13 are slidably arranged, it of course being noted that these piston elements extend diametrically across the circular head 11.

The closure plate 7 is provided with a concentrically disposed sleeve 14 adapted to be engaged over the adjacent portion of the driven shaft 2 and has its outer end effectually closed by a stuffing gland 15, which gland is turned into engagement with a suitably screw threaded portion 16 formed thereon.

The lower portion of the circular casing 5 or drum is provided with a semi-circular partition 17 having a valve seat 19 formed upon one face thereof, which seat corresponds to the shape of the rotatable one way valve 18 mounted between the said partition and the adjacent portion of the wall of the drum, which is offset as at 20 for receiving the opposite side of the said valve. The stem 21 of the rotatable valve is provided with a spiral gear 22, which gear in turn, is normally engaged by a worm gear 23 arranged on the lower end of a shaft 24 mounted in bearings 25 upon the outer side of the closure plate 7. A pinion 26 is arranged on the upper end of the shaft 24 and meshes with a rack 27 carried on a collar 28 slidable over the sleeve 14 of the closure plate. In order that the collar 28 can be moved, a lever 29 is provided and has its lower end loosely engaged in a suitable bearing formed on one end of the slidable collar; it being noted that the lever 29 is mounted upon a bracket 30 supported adjacent the bearing 3. Thus, by rocking the lever 29 rotary motion will be imparted to the shaft 24 and hence, to the valve 18, thereby alining the way in the same with the channel formed between the partition 17 and the adjacent portion of the wall of the drum 5.

Curved elements or shoulders 31 are arranged upon the inner side of the casing or drum 5 and project inwardly for a distance sufficient to permit the sliding pistons 13 to be engaged therewith during rotation of the head 11 in the said drum.

To prevent leakage of the heavy fluid, such as oil or the like which is arranged in the drum, a stuffing gland 32 is engaged with the valve stem 21 and effectually closes the bearing opening through which the same extends.

In operation, and assuming that the drum is filled with a heavy fluid such as oil or the like, when the valve 18 is opened, the casing or drum connected to the driving shaft will be able to rotate about the head 11, the said head, obviously remaining stationary. During rotation of the drum about the head 11, the piston elements 13 carried thereby will be moved due to their engagement with the curved shoulders 31, thus permitting free passage of the partition 17 thereby, but, of course, the shoulders are comparatively narrow so as to permit the oil to circulate freely when the valve is open. However, as soon as the lever 29 is operated so as to partially close the valve 18, the oil will then pass more slowly through the valve, thus producing a pressure on the piston elements 13 carried by the head member 11 and as a consequence, causing the said head 11 and its respective piston elements to rotate slowly along with the drum 5, giving a certain speed of rotation to the driven shaft 2. If the valve 18 is now entirely closed, the head member 11 together with its piston elements 13 will rotate at the same speed as the drum, giving the driven shaft the maximum or high speed.

I desire to have it understood, that the drum 5 is to be made heavy enough to serve as a fly wheel. However, by retaining the ordinary fly wheel, the transmission means can be reversed in position and the driven shaft 2 then serve as the driving shaft.

It of course will be understood that my invention may be effectually used as a clutch whereby driving and driven members may be interconnected in a manner such as will prevent the straining or distortion of the same due to the sudden application of load or driving torque; the movement of the blades or piston elements 13 through the fluid contained by the casing, obviously, compensating for this and allowing the load to be gradually applied to the driven members.

Manifestly, the construction shown is capable of considerable modification and such modification as is within the scope of my claims, I consider within the spirit of my invention.

I claim:

1. In combination with driving and driven shafts, a drum mounted on one of the shafts containing a heavy fluid, a closure plate for said drum provided with an internal seat, a circular head rotatably mounted in the seat and engaged with the other shaft, flange segments carried by the head, slidable piston elements confined between the segments and engaged with the drum, head and plate, a partition arranged in one portion of the drum, curved shoulders arranged adjacent the terminals of the partition and adapted to be engaged by the slidable piston elements, and fluid controlling means arranged between the partition and adjacent portion of the drum for controlling the circulation of fluid therein.

2. In combination with driving and driven shafts, a drum mounted on one of said shafts containing a heavy fluid, pistons rotatably mounted in said drum and engaged with the other shaft and movable radially of the latter, a partition arranged in the drum, a fluid control valve arranged between the partition and the side wall of the drum, a stem carried by the valve projecting exteriorly of the drum, a radially disposed shaft rotatably supported upon the drum and having connection with the valve stem whereby rotary movement of the shaft is transmitted to the valve, a pinion carried by the inner terminal of the shaft, a sleeve slidably supported upon one of the shafts, a rack bar carried by the sleeve and meshing with the pinion, and means to shift the sleeve longitudinally of the shaft to produce a reciprocating movement of the rack bar.

In testimony whereof, I affix my signature hereto.

CARL E. ERICKSON.